3,017,294
PROCESS FOR SIZING
Harry Meisel, Englewood, N.J., assignor to Corn Products Company, a corporation of Delaware
No Drawing. Filed Oct. 1, 1958, Ser. No. 764,485
3 Claims. (Cl. 117—139.5)

This invention relates to a new and novel method of sizing substances, e.g., cellulosic substances, with starch derivatives and has particular application in the textile and paper fields.

Starch, either raw or modified, has long been used in sizing textiles in various stages of their manufacture as well as in sizing of garments in home and commercial laundries. Starch is also used in sizing paper, e.g., in the beater and at the head box before the formation of the sheet. After the sheet is formed, it is sized with starch by the practice of tub sizing, the sheet being the counterpart of the fabric in textile sizing. Starch is also used in clay coating of paper, in laminating and corrugating adhesives, and the like.

In virtually all of the aforementioned applications, it is customary to use the starch in gelatinized (paste) form. A paste is prepared either by cooking raw or modified starch in water or by dispersing a pregelatinized starch in cold or warm water. Then the material to be sized is dipped into, or passed through, or added to the paste which operation leaves a film of starch paste on the material. Subsequent drying stiffens the film on the material.

Cold water starching of garments consists in dipping the garment into a cold water slurry of ungelatinized starch and ironing the garment in the presence of sufficient moisture to gelatinize the starch.

In these applications several problems are involved. For example, not only is there the problem of obtaining a uniform film or distribution of the starch on the material being sized, but also the problem of getting the proper amount or degree of sizing. These difficulties are probably due to the following reasons. Cellulosic materials, such as textiles, paper pulp, paper, etc., carry an anionic charge. Cooked starches used in sizing baths or uncooked starches used in dipping baths have heretofore been non-ionic in nature, or charged similarly to the cellulosic materials. Natural starches in their unmodified state carry substantially no charge. Oxidized starches and most starch esters are anionic in behavior.

Because of the charge relationships, a contact of cellulosic material in a solution or cooked paste or suspension of starch could result only in a non-substantive wetting of fiber or fabric, for example, or physical entrapment of starch granules, both of which results may be non-uniform due to non-homogeneity of paste, folds in garments, etc. The solution or liquid passing through the material, or remaining in the sizing vessel is essentially of the same constitution as that picked up by the cellulosic substance. The fiber, sheet or fabric, for example, would remove basically the same ratio of starch solids to water, as in the original starch to water composition, leaving a lesser amount of total liquid but of unchanged water to starch composition.

As a result of the above described characteristics of cellulosic materials and starches, there cannot be a quantitative use of the starch and much of it eventually finds its way, in commercial operations, into the waste discharged into nearby streams. This represents an economic loss and also creates a serious sewage disposal problem, particularly with paper mills, in view of the large volumes of water used in their processes.

I have discovered that I can overcome the above difficulties and, at the same time, contribute additional advantages by sizing cellulosic substances, e.g., textiles, paper, with a starch derivative containing nitrogen and bearing a positive charge. For the sake of brevity these starch derivatives will sometimes be referred to hereinafter as cationic starches. By the use of a cationic starch which is charged oppositely to the cellulose the relationships between the negatively charged fibers, the cationic starch, and the aqueous medium are changed. The starch is picked up aliquot-wise with the aqueous medium. Products which are suitable for my invention include starch in unswollen granule form on which quaternary ammonium nitrogen has been substituted. Cationic starches which are particularly suitable for my invention may be made by reacting, in contact with an alkaline catalyst under non-gelatinizing conditions starch with the reaction product of epihalohydrin and a compound from the group consisting of tertiary amines and tertiary amine salts; the tertiary amine being represented by the formula

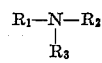

wherein $R_1$, and $R_2$ and $R_3$ are radicals from the group consisting of alkyl, substituted alkyl, alkene, aryl, aralkyl and cyclic formed by joining two of the R's and when all three $R_1$, $R_2$ and $R_3$ are the same, each is an alkyl group containing not more than 3 carbon atoms, and when $R_1$, $R_2$ and $R_3$ are not the same and when $R_3$ contains 4 to 18 carbon atoms, then each $R_1$ and $R_2$ is an alkyl group not larger than ethyl, and when $R_1$ and $R_2$ are joined to form a ring, then $R_3$ is an alkyl group not larger than ethyl; said recation product being substantially free of epihalohydrin. No claim is made herein to this method of producing cationic starch, this being claimed in co-pending application Serial No. 631,429, filed December 31, 1956, now U.S. Patent No. 2,876,217, which is a continuation-in-part of Serial No. 554,126, filed December 20, 1955, now abandoned.

The startling discovery concerning cationic starch as a sizing agent is that it may be used for sizing purposes without pasting it and that it can be distributed uniformly on the material to be sized.

To carry out the invention, the simplest method is to slurry the cationic starch in granule form in cold water and pass the material to be sized through the slurry or add the slurry to the material to be sized, e.g., to the beater for beater sizing. The starch granules attach or anchor themselves uniformly to the cellulosic fibers by virtue of their opposite charges and subsequent gelatinization and drying in situ provides the cementing bonds between the cellulosic fibers. Certain synthetic fibers, e.g., acetate, rayon may be sized similarly.

The invention will be further illustrated by the following examples which are intended as typical and informative only and in no way limiting the invention.

EXAMPLE I

Twenty-five grams of cationic starch [1] was slurried in cold water and added to a standard household automatic washing machine half filled with warm water. Three and one-half pounds of cotton clothes were added, the agitator run 4 minutes, and then the clothes were spun. During the agitation period, the milky appearance of the water unbelievably disappeared indicating that no starch was left in the slurry to go down the drain. After the spin, very little piling up of starch could be seen on the sides of the washer, and no spots could be observed on the garments. A test skirt from this load (containing less than 1 oz. of cationic starch) was ironed immediately without drying

[1] This starch had a D.S. of 0.04 and was prepared as described in Example V.

and found to contain slightly more sizing than obtained with 340 grams of an instant laundry starch (presently available at grocers' stores) under the same conditions. Using the same conditions, it was found that 50 grams of cationic starch gave a medium-light size and 75 grams gave a medium sizing.

EXAMPLE II

The procedure of Example I was repeated except 75 grams of the same cationic starch to which had been added 6 percent of borax was added to the washer. The sizing was judged "medium-heavy," heavier than when no borax was used (Example I).

EXAMPLE III

For comparison the procedure in Example II was repeated except 100 grams of raw corn starch containing 6 percent of borax was used. It was observed that the water was milky in appearance at the end of the agitation and that there were no starch spots on the garments. However, after the spin, heavy deposits of starch were found on the garments and on the sides of the machine.

EXAMPLE IV

*Preparation of cationic starch.*—The trimethylamine addition product of epichlorohydrin was prepared by adding 171 lbs. of 25 percent solution of trimethylamine to 61 lbs. of epichlorohydrin in 555 lbs. of water and allowing the reaction to proceed at room temperature. The pH of the resultant reaction product was adjusted to 7.0 with sulfuric acid. Residual epichlorohydrin was removed by evaporation for 10 hours at 125° F. under 22–23 inches vacuum. The pH of the concentrated liquor was adjusted to 7.0 with sulfuric acid. The concentrated reaction product was added to a slurry containing 122 lbs. of sodium sulfate to 1000 lbs. of starch as a 22 Bé. slurry. Then 16 lbs. of sodium hydroxide was added and the slurry held for 16 hours at 125° F. under atmospheric conditions. The pH was adjusted to 7.0 with sulfuric acid. The resultant cationic starch was filtered, washed and dried. The D.S. of the product was 0.04 and a paste made of 5 grams of starch in 280 ml. of water had a Scott viscosity of 80 seconds.

EXAMPLE V

The procedure in Example IV was repeated except 291 lbs. of triethylamine solution was used in place of trimethylamine. The product had a D.S. of 0.04 and the Scott viscosity was 95 seconds when 3 grams of the cationic starch (dry basis) was cooked in 280 ml. of water.

EXAMPLE VI

In this example, cationic starch prepared in accordance with Example V was used. When a one pound cotton garment was immersed in an aqueous slurry containing 7 grams of this cationic starch, a light starch finish resulted. Fifteen grams of this starch produced a medium finish and 20 grams a heavy finish. In each of the examples, the amount of water used for slurrying the starch was not critical since all of the starch suspended in the water was attracted to the fabric and held there even when wrung out. The distribution of the starch was even and uniform over the surface and when the starch was gelatinized under the iron, the bond which formed in situ was ideal since the pickup of starch was quantitative and uniform. Since the amount of water is not critical, cationic starch is ideally suited for automatic washers since the starch will not be spun out during spinning since once attached to the fabric, it will remain.

EXAMPLE VII

Cationic starch produced in accordance with Example IV was used in sizing rayon, acetate and dacron-cotton blend garments. Thirty grams of the starch containing 12 percent of borax was used for a 4 lb. load of a blend of the above types of clothing.

The cationic starch was attracted to both acetate and rayon but use of the starch was considered more beneficial on acetate crepe and broadcloth than on spun rayon broadcloth and rayon gabardine. The cationic starch was only negligibly, if at all, attracted to the one garment made of a dacron-cotton blend.

EXAMPLE VIII

A series of quaternary ammonium cationic starches with degrees of substitution ranging from 0.023 to 0.11 and made in accordance with the method described in Example IV, using appropriate amounts of the reagent to obtain the desired degree of substitution, were tested for sizing properties. The sizing procedure was as follows: 1.35 grams, dry basis, of cationic starch was agitated in 1 quart of water at 80° F. for 15 seconds. Two cloth swatches (12″ x 17.5″) weighing 30 grams were added to the slurry and agitated therein for 30 seconds. They were removed and hand squeezed and ironed.

The results in Table I show that as the degree of substitution is increased to approximately 0.06, the percent of starch removed by a given weight of cloth from an aqueous suspension (based on the same weight of starch) increases.

*Table I*

| Cationic Starch, D.S. | Percent Cloth Moisture [a] | Dry Sub. Starch in Cloth [b], Grams Per 2.9 ft. | Dry Sub. Starch in Cloth [c], Grams Per 2.9 ft. | Percent D.S. Starch in Cloth [d] |
|---|---|---|---|---|
| Blank | 50 | | | |
| No. 3402 [e] | 52 | 0.05 | 0.38 | 28 |
| 0.023 | 52 | 0.47 | 0.71 | 53 |
| 0.033 | 52 | 0.66 | 0.72 | 53 |
| 0.043 | 53 | 0.70 | 1.0 | 74 |
| 0.05 | 53 | 0.73 | 1.0 | 74 |
| 0.061 | 51 | 0.83 | 1.04 | 77 |
| 0.081 | 52 | | 0.81 | 60 |
| 0.11 [f] | 50 | | 0.70 | 52 |

[a] Hand squeezed.
[b] Estimated from filtration measurements.
[c] Estimated from gain in cloth weight measurements.
[d] Based on gain in cloth weight measurements; i.e., fraction of starch removed from aqueous suspension by the cloth.
[e] Commercial thick-boiling corn starch.
[f] Allowed to hydrate 30 minutes before being used.

EXAMPLE IX

This example shows additional effects of cationic starch over those in Example VIII.

*Table II*

| Starch Derivative Made From— | D.S. | Percent Starch Product Removed From Dispersion by Cloth [a] | General Ironing Characteristics | Relative Stiffness Rating [b] |
|---|---|---|---|---|
| Triethylamine-epichlorohydrin [c] | 0.04 | 51 | Fair | 13 |

[a] Based on the use of 91 grams of starch product per 15 gallons of water and 4 pounds of cotton cloth.
[b] Commercially available liquid starch 1:1 dilution equals 10.
[c] Made as described in Example V.

This application is a continuation-in-part of application Serial No. 622,545, filed November 16, 1956, now abandoned.

I claim:

1. A process for sizing cellulosic substances which comprises contacting them in an aqueous medium with a starch derivative containing nitrogen and in unswollen granule form; said derivative being made by reacting, in contact with an alkaline catalyst under non-gelatinizing conditions starch with the reaction product of epihalohydrin and a compound from the group consisting of tertiary amines and tertiary amine salts; the tertiary amine being represented by the formula

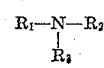

wherein $R_1$, $R_2$ and $R_3$ are radicals from the group consisting of alkyl, substituted alkyl, alkene, aryl, aralkyl and cyclic formed by joining two of the R's and when all three $R_1$, $R_2$ and $R_3$ are the same, each is an alkyl group containing not more than 3 carbon atoms, and when $R_1$, $R_2$ and $R_3$ are not the same and when $R_3$ contains 4 to 18 carbon atoms, then each $R_1$ nd $R_2$ is an alkyl group not larger than ethyl, and when $R_1$ and $R_2$ are joined to form a ring, then $R_3$ is an alkyl group not larger than ethyl; said reaction product being substantially free of epihalohydrin; said derivative being simultaneously gelatinized and dried in situ on said cellulosic substances.

2. Process of sizing cellulosic substances which comprises contacting them with an aqueous slurry of a cationic quaternary ammonium starch derivative formed by reacting starch with

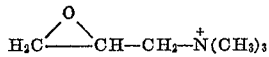

in the presence of an alkaline catalyst; said derivative being simultaneously gelatinized and dried in situ on said cellulosic substances.

3. Process of sizing cellulosic substances which comprises contacting them with an aqueous slurry of a cationic quaternary ammonium starch derivative formed by reacting starch with

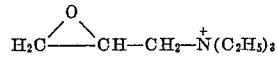

in the presence of an alkaline catalyst; said derivative being simultaneously gelatinized and dried in situ on said cellulosic substances.

References Cited in the file of this patent

UNITED STATES PATENTS

| | | |
|---|---|---|
| 2,301,509 | Bock | Nov. 10, 1942 |
| 2,733,238 | Kerr | Jan. 31, 1956 |
| 2,773,057 | Hjermstad et al. | Dec. 4, 1956 |
| 2,813,093 | Caldwell et al. | Nov. 12, 1957 |
| 2,876,217 | Paschall | Mar. 3, 1959 |